United States Patent [19]
Housiaux

[11] Patent Number: 5,259,431
[45] Date of Patent: Nov. 9, 1993

[54] AIRCRAFT TIRE WITH SIDEWALL VANES

[76] Inventor: Richard J. Housiaux, Waerenga Road, Otaki, New Zealand

[21] Appl. No.: 445,822

[22] Filed: Dec. 4, 1989

[51] Int. Cl.$^5$ .............................................. B60C 13/00
[52] U.S. Cl. .................. 152/523; 244/103 S
[58] Field of Search ...................... 152/523; 244/103 S

[56] References Cited

U.S. PATENT DOCUMENTS

| | | | |
|---|---|---|---|
| 1,833,019 | 11/1931 | Faucher et al. | 152/523 |
| 2,410,625 | 11/1946 | Branner | 244/103 S |
| 2,412,033 | 12/1946 | Crosby | 244/103 S |
| 3,233,849 | 2/1966 | Rubin | 244/103 S |

FOREIGN PATENT DOCUMENTS

| | | | |
|---|---|---|---|
| 1756749 | 4/1970 | Fed. Rep. of Germany | 152/523 |
| 2080217 | 2/1982 | United Kingdom | 244/103 S |

*Primary Examiner*—Geoffrey L. Knable

[57] ABSTRACT

This invention introduces a tire for aircraft. The tire of the invention is provided with drive means to revolve the wheel of the aircraft at landing procedure before the aircraft actually touches the ground. The drive means consist of airflow responsive configurations on the tire. Preferably vanes of a specific configuration are formed on the tire to cause a bigger resistance to airflow along the tire at the bottom-most portion of the tire relative to the uppermost portion of the revolving tire. The bigger resistance of that portion of the tire which is closer to the ground forces the tire to revolve. Thereby it is possible to revolve the wheels of the aircraft automatically by the movement of the aircraft through the air and as a result thereof the wheels of the aircraft revolve at the moment of touching the ground with a speed which is substantially equal at the periphery of the tire relative to the speed of the aircraft to the ground. As far as equalness of the mentioned speeds is not fully obtained, the relative speed between the periphery of the tire and the ground at the moment of landing is reduced by the tire of the present invention.

4 Claims, 8 Drawing Sheets

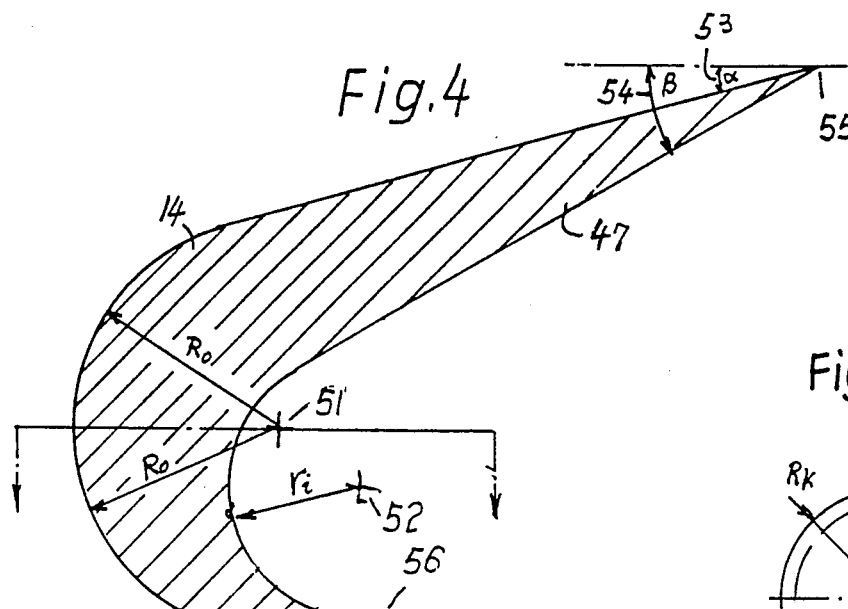
Fig. 4
Fig. 7
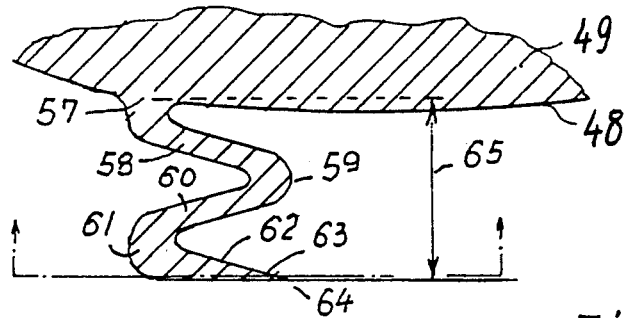
Fig. 5
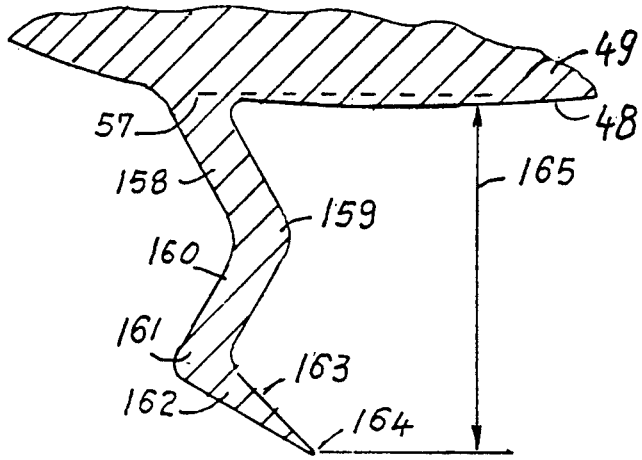
Fig. 6
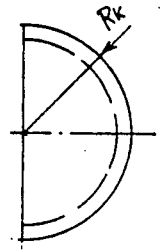
Fig. 8

Fig. 11

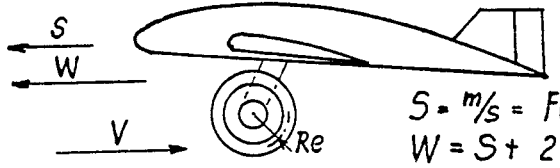

$S = m/s$ = FORWARD SPEED OF AIRCRAFT
$W = S + 2R_t \pi U$  with $U$ = REVOLUTION/second
$Vr$ = CIRCUMFERENTIAL SPEED OF VANE
$U = Vr_F / 2R_t \pi$.   $a$ = ACCELERATION

- (11) = $A_t$ = AREA OF VANE ON TOP
- (12) = $A_b$ = AREA OF VANE AT BOTTOM
- (13) = R = m = RADIUS OF LOCATION ON TIRE
- (17) = 9 = 0.125  (18) = 9/2 = 0.06125
- (21) = M = WEIGHT/9.81 = 10.19 Kg.*
- (14) = $Cw_t$ = COEFFICIENT OF RESISTANCE OF VANE ON TOP
- (15) = $Cw_B$ = COEFFIENT OF RESISTANCE OF VANE ON BOTTOM
- (16) = M = MASS OF TIRE + WHEEL, IF CONCENTRATED AT "R".
- (19) = F = M·a  (20) = a = F/M  (21) = F = FORCE
- (31) = $\Delta t$ = TIME IN SECONDS AFTER START
- (22) = $F_t$ = FORCE ON VANE ON TOP = $F_t = A_t Cw_t (9/2) W^2$
- (23) = $F_b$ = FORCE ON VANE ON BOTTOM = $F_b = A_b Cw_B (9/2) V^2$

| (31) | (32) | (33) | (34) | (35) | (36) | (37) | (38) | (39) | (40) | (41) | (42) | (43) | (44) |
|---|---|---|---|---|---|---|---|---|---|---|---|---|---|
| TIME AFTER START | | (32)−(31) | | | (18)(34)(35)(33)×(33) | (32)+(44) | | | (18)(38)(39)(37)×(37) | (36)−(40) | (41)/(21) | (42)×Δt (1 INTERV.) | Σ old plus new Vrs |
| Δt | S | V | A | Cwb | Fb | W | A | Cwt | Ft | ΔF | a | Vr₁ | Vr_F |
| s | m/s | m/s | m² | | Kg | m/s | m² | | Kg | Kg | m/s² | m/s | m/s |
| 0 | 40 | 40 | 0.06 | 1.3 | 7.6 | 40 | 0.06 | 0.3 | 1.76 | 5.85 | 0.573 | 5.73 | 5.73 |
| 10 | " | 34.27 | " | " | 5.61 | 45.73 | " | " | 2.31 | 3.30 | .32 | 3.2 | 8.93 |
| 20 | " | 31.07 | " | " | 4.61 | 48.93 | " | " | 2.64 | 1.92 | .193 | 1.93 | 10.86 |
| 30 | " | 29.14 | " | " | 4.06 | 50.86 | " | " | 2.85 | 1.21 | .119 | 1.19 | 12.05 |
| 40 | " | 27.95 | " | " | 3.73 | 52.05 | " | " | 2.99 | .74 | .073 | .73 | 12.78 |
| 50 | " | 27.22 | " | " | 3.54 | 52.78 | " | " | 3.07 | .47 | .046 | .46 | 13.24 |
| 60 | " | 26.76 | " | " | 3.42 | 53.24 | " | " | 3.12 | .30 | .029 | .29 | 13.53 |
| 70 | " | 26.47 | " | " | 3.35 | 53.53 | " | " | 3.16 | .19 | .0186 | .186 | 13.72 |
| 80 | " | 26.28 | " | " | 3.30 | 53.72 | " | " | 3.18 | .12 | .0118 | .12 | 13.84 |
| 90 | " | 26.16 | " | " | 3.26 | 53.84 | " | " | 3.20 | .06 | .0059 | .06 | 13.90 |
| 100 | " | 26.10 | " | " | 3.25 | 53.90 | " | " | 3.20 | .05 | .0049 | .05 | 13.95 |
| 110 | " | 26.05 | " | " | 3.24 | 53.95 | " | " | 3.21 | .03 | .0029 | .03 | 13.98 |
| 120 | " | 26.02 | " | " | 3.23 | 53.98 | " | " | 3.21 | .02 | .0020 | .02 | 14.00 |
| 130 | " | 26.0 | " | " | 3.229 | 54.0 | " | " | 3.215 | .014 | .0009 | .01 | 14.01 |

Fig. 12

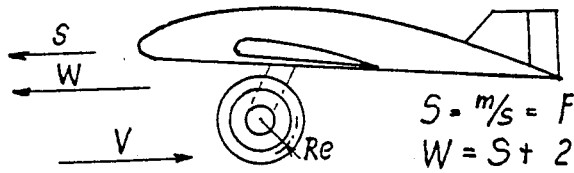

$S = m/s =$ FORWARD SPEED OF AIRCRAFT
$W = S + 2R_t \pi U$ with $U =$ REVOLUTION/second
$V_r =$ CIRCUMFERENTIAL SPEED OF VANE
$U = V_{rF} / 2R_t \pi$.   $a =$ ACCELERATION

- (11) = $A_t$ = AREA OF VANE ON TOP
- (12) = $A_b$ = AREA OF VANE AT BOTTOM
- (13) = $R$ = m = RADIUS OF LOCATION ON TIRE
- (17) = $\rho$ = 0.125  (18) = $\rho/2$ = 0.06125
- (21) = M = WEIGHT/9.81 = 10.19 Kg.*
- (22) = $F_t$ = FORCE ON VANE ON TOP = $F_t = A_t C_{wt} (\rho/2) W^2$
- (14) = $C_{wt}$ = COEFFICIENT OF RESISTANCE OF VANE ON TOP
- (15) = $C_{wb}$ = COEFFIENT OF RESISTANCE OF VANE ON BOTTOM
- (16) = M = MASS OF TIRE + WHEEL, IF CONCENTRATED AT "R".
- (19) = $F = M \cdot a$   (20) = $a = F/M$   (21) = F = FORCE
- (31) = $\Delta t$ = TIME IN SECONDS AFTER START
- (23) = $F_b$ = FORCE ON VANE ON BOTTOM = $F_b = A_b C_{wb} (\rho/2) V^2$

| (31) | (32) | (33) | (34) | (35) | (36) | (37) | (38) | (39) | (40) | (41) | (42) | (43) | (44) |
|---|---|---|---|---|---|---|---|---|---|---|---|---|---|
| TIME AFTER START | | (32) − (31) | | | (18)(34) (35)(33) ×(33) | (32) + (44) | | | (18)(38) (39)(37) ×(37) | (36) − (40) | (41)/(21) | (42) ×Δt (1 INTERV.) | Σ old plus new Vrs |
| Δt | S | V | A | $C_{wb}$ | $F_b$ | W | A | $C_{wt}$ | $F_t$ | ΔF | a | $V_{rI}$ | $V_{rF}$ |
| s | m/s | m/s | m² | | Kg | m/s | m² | | Kg | Kg | m/s² | m/s | m/s |
| 0 | 60 | 60 | 0.06 | 1.3 | 17.55 | 60 | 0.06 | 0.3 | 4.05 | 13.5 | 1.32 | 13.2 | 13.2 |
| 10 | " | 46.8 | " | " | 10.68 | 73.2 | " | " | 6.03 | 4.65 | 0.46 | 4.6 | 17.8 |
| 20 | " | 42.2 | " | " | 8.68 | 77.8 | " | " | 6.80 | 1.88 | .18 | 1.8 | 19.6 |
| 30 | " | 40.4 | " | " | 7.96 | 79.6 | " | " | 7.13 | 0.83 | .081 | 0.81 | 20.41 |
| 40 | " | 39.59 | " | " | 7.64 | 80.41 | " | " | 7.27 | .37 | .036 | .36 | 20.77 |
| 50 | " | 39.23 | " | " | 7.50 | 80.77 | " | " | 7.34 | .16 | .016 | .16 | 20.93 |
| 60 | " | 39.07 | " | " | 7.44 | 80.93 | " | " | 7.37 | .07 | .007 | .07 | 21.00 |
| 70 | " | 39.00 | " | " | 7.415 | 81.0 | " | " | 7.38 | .035 | .0035 | .035 | 21.035 |
| 80 | " | 38.965 | " | " | 7.40 | 81.035 | " | " | 7.39 | .01 | .001 | .01 | 21.045 |

Fig. 13

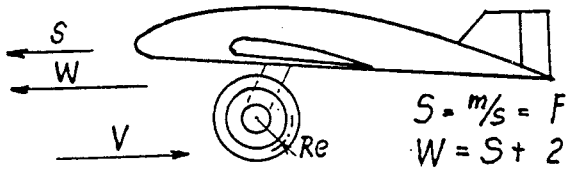

S · m/s = FORWARD SPEED OF AIRCRAFT
W = S + 2Re·πU  with  U = REVOLUTION/second
Vr = CIRCUMFERENTIAL SPEED OF VANE
U = Vrf/2Re·π.    a = ACCELERATION

(11) = At = AREA OF VANE ON TOP
(12) = Ab = AREA OF VANE AT BOTTOM
(13) = R = m = RADIUS OF LOCATION ON TIRE
(17) = ς = 0.125   (18) = ς/2 = 0.06125
(21) = M = WEIGHT/9.81 =            Kg.
(22) = Ft = FORCE ON VANE ON TOP = Ft = At·Cwt·(ς/2)W²

(14) = Cwt = COEFFICIENT OF RESISTANCE OF VANE ON TOP
(15) = Cwb = COEFFICIENT OF RESISTANCE OF VANE ON BOTTOM
(16) = M = MASS OF TIRE + WHEEL, IF CONCENTRATED AT "R".
(19) = F = M·a   (20) = a = F/M   (21) = F = FORCE
(31) = Δt = TIME IN SECONDS AFTER START
(23) = Fb = FORCE ON VANE ON BOTTOM = Fb = Ab·Cwb·(ς/2)V²

| (31) | (32) | (33) | (34) | (35) | (36) | (37) | (38) | (39) | (40) | (41) | (42) | (43) | (44) |
|---|---|---|---|---|---|---|---|---|---|---|---|---|---|
| TIME AFTER START | (32) | (32)−(31) | | | (18)(34)(35)(33)×(33) | (32)+(44) | | | (18)(38)(39)(37)×(37) | (36)−(40) | (41)/(21) | (42)×Δt (1 INTERV.) | Σ old plus new Vrs |
| Δt | S | V | A | Cwb | Fb | W | A | Cwt | Ft | ΔF | a | Vrɪ | Vrf |
| s | m/s | m/s | m² | | Kg | m/s | m² | | Kg | Kg | m/s² | m/s | m/s |
| 0 | 20 | 20 | 0.06 | 1.3 | 1.95 | 20 | 0.06 | 0.3 | 0.45 | 1.5 | 0.147 | 1.47 | 1.47 |
| 10 | " | 18.3 | " | " | 1.63 | 21.47 | " | " | .52 | 1.11 | .109 | 1.09 | 2.56 |
| 20 | " | 17.49 | " | " | 1.48 | 22.56 | " | " | .57 | 0.91 | .089 | 0.89 | 3.45 |
| 30 | " | 16.55 | " | " | 1.335 | 23.45 | " | " | .62 | .715 | .07 | .7 | 4.15 |
| 40 | " | 15.85 | " | " | 1.224 | 24.15 | " | " | .656 | .568 | .05 | .5 | 4.65 |
| 50 | " | 15.35 | " | " | 1.15 | 24.65 | " | " | .68 | .47 | .046 | .46 | 5.11 |
| 60 | " | 14.89 | " | " | 1.08 | 25.11 | " | " | .71 | .37 | .036 | .36 | 5.47 |
| 70 | " | 14.53 | " | " | 1.03 | 25.47 | " | " | .73 | .30 | .030 | .30 | 5.77 |
| 80 | " | 14.23 | " | " | 0.987 | 25.77 | " | " | .747 | .24 | .023 | .23 | 6.00 |
| 90 | " | 14 | " | " | .956 | 26 | " | " | .76 | .20 | .020 | .20 | 6.20 |
| 100 | " | 13.8 | " | " | .93 | 26.2 | " | " | .77 | .16 | .016 | .16 | 6.34 |
| 110 | " | 13.66 | " | " | .91 | 26.34 | " | " | .78 | .13 | .013 | .13 | 6.47 |
| 120 | " | 13.53 | " | " | .89 | 26.47 | " | " | .79 | .10 | .010 | .10 | 6.57 |

5,259,431

AIRCRAFT TIRE WITH SIDEWALL VANES

BACKGROUND OF THE INVENTION

1. Field of the Invention

This invention relates to tire of aircraft.

2. Discussion of the Prior Art

When an aircraft touches the ground at landing with a non-revolving wheel, a portion of the periphery of the tire suddenly touches the ground.

While the aircraft still has a relatively high speed of about hundred miles per hour, the periphery of the tire is in rest. At the moment when the tire touches the ground at landing, the ground immediately touches a portion of the periphery of the tire with a relative speed of roughly 100 miles per hour. Since the wheel and the tire have an own mass, they are unable to accelerate in the moment of meeting of tire and ground to the equalness of speed of the aircraft and peripheral speed of the respective tire. Consequently, the tire slips a while on the ground and is at this time subjected to great wear and heating. That shortens the life time of the tire tremendously.

This shows that the commonly used aircraft tires of the prior art have life-time and efficiency problems which require an improvement.

It is the intention of this invention, to provide such required improvement of tires of aircraft.

SUMMARY OF THE INVENTION

It is the object of this invention to provide the wheels of aircraft with tires, which revolve the wheels before actual touch down of the aircraft to a speed which reduces the difference of speeds between the ground and the periphery of the tire for the moment of touch down of the craft.

Another object of the invention is to prevent the slip of the tires on the ground during landing of aircraft.

A still further object of the invention is to prevent the speedy wear off of air craft tires at landing of aircraft.

Still another object of the invention is to revolve and accelerate the wheels of aircraft at landing procedures previous to the actual touching of the ground, without mechanical machinery.

It is also an object of the invention to revolve and accelerate the landing wheels of aircraft exclusively by the relative speed between the aircraft and the surrounding air.

Still another object of the invention is to obtain a revolving of the wheels of the aircraft prior to actual touch of the ground by specific configurations of the tires of the landing wheels.

A portion of the last mentioned object of the invention is, to provide extensions on the tire which have different resistance coefficients on the portions of the tire which are above the axis of the wheel and those portions of the tire which are below the axis of the respective landing wheel.

A preferred object of the invention is to provide the extensions with higher coefficient of resistance on those portions of the respective tire which are at the respective time below the axis of the respective landing wheel.

It is also an object of the invention to provide the mentioned extensions of the tire in such a style that at every angle of rotation the extensions with higher coefficient of resistance are below the axis of the wheel automatically and without the requirement of controllers or of human supervision.

More objects of the invention are, as follows:

Where the wheels of an aircraft, and therefore their tires, are stationary, relative to the aircraft, at touch down on landing ground, there is a large differential in velocity between the points of the tires which make first contact with the landing ground and to the landing ground itself. From the moment the tires make contact with the landing ground they begin to rotate, the rate of rotation increasing very rapidly to that rate appropriate for the particular speed of the aircraft moving on the landing ground, then gradually slowing down as the aircraft is braked. At the moment of touch down, there are considerable impact forces acting on the tires and these forces produce most of the wear and tear suffered by the tires. It was this problem in mind that the present invention was devised.

The present invention broadly consists in an aircraft tire wherein the tire has rotation means such that when the tire is mounted on a wheel of an aircraft and the aircraft is flying with the wheel down so that air flows past the tire, the airflow interacts with the rotation means to produce a net force causing or tending to cause rotation being such as to reduce the impact forces on the tire when the aircraft lands while moving over the landing ground.

Preferably the rotation means comprises a plurality of vanes attached to a side of the tire.

Preferably the vanes are moulded integrally with the tire.

Preferably each vane has a hooked shaped end portion leading to an elongated tail end portion.

Preferably the hook shaped end portion of the vane faces inwardly.

Preferably the tail end portion of the vane is angled outwardly with respect to the tangent to the circle described by the tire radius at the position of the vane.

Preferably the angle is 10 to 20 degrees with respect to the mentioned tangent, most preferably about 15 degrees.

Preferably the tail end portion of any vane terminates on a radial line of the tire and the hooked shaped end portion of the next vane commences substantially from that same radial line or is spaced therefrom by a distance substantially less than the length of the vane.

This invention may also be said broadly to consist in the parts, elements, and features referred to or indicated in the specification of the application, individually or collectively, and any or all combinations of any two or more of said parts, elements or features, and where specific integers are mentioned herein which have known equivalents in the art to which this invention relates, such as known equivalents are deemed to be incorporated herein as if individually set forth.

The above defines the present invention, a preferred form and preferred forms which will now be described with reference to the accompanying drawings.

BRIEF DESCRIPTION OF THE DRAWINGS

FIG. 4 illustrates a cross sectional view through a vane of the invention.

FIGS. 5 and 6 show cross sectional views through another embodiment of a vane of the invention in differently extended locations.

FIGS. 7 and 8 show resistance bodies of the prior art for the evaluation of the coefficients of resistance of the vanes of the invention.

FIG. 11 shows an example of calculation in the form of FIG. 10.

FIGS. 12 and 13 show calculations for other forward speeds of the aircraft again in the form of FIG. 10 and with equal vanes as in FIG. 11.

DESCRIPTION OF THE PREFERRED EMBODIMENTS

Figure 1:
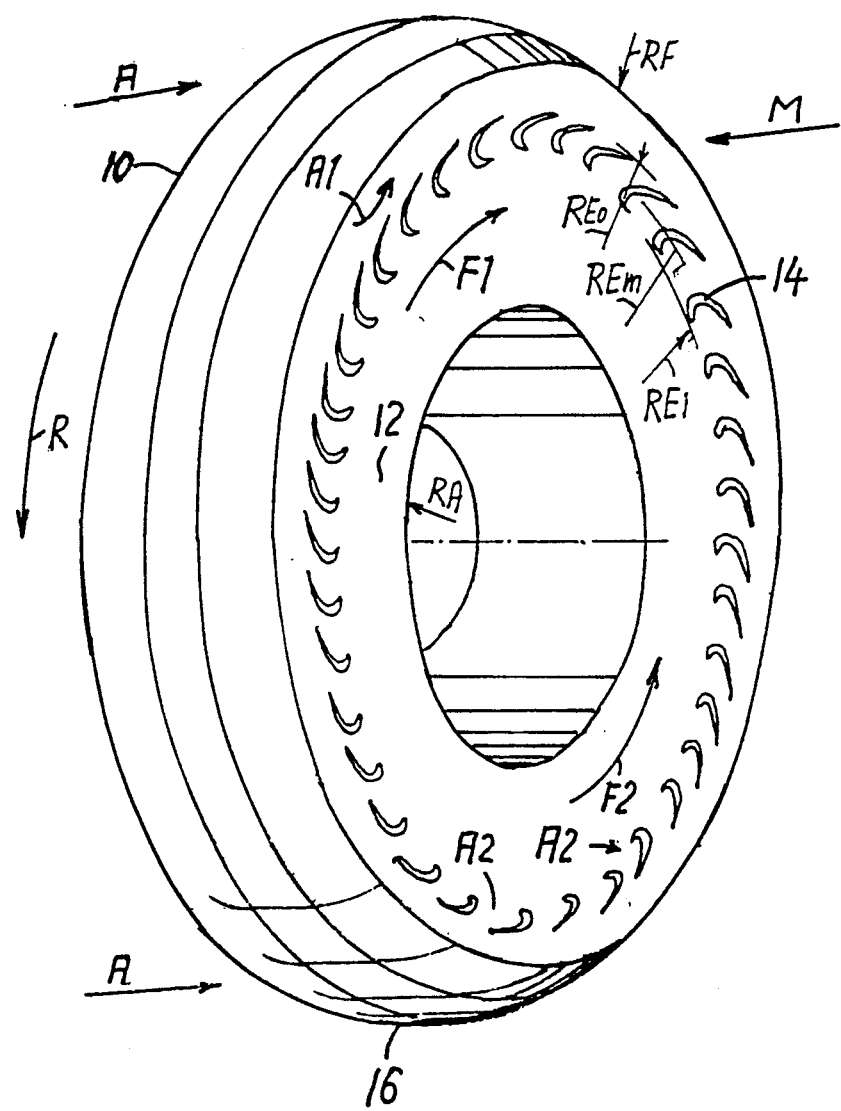
FIG. 1 shows a perspective view of an aircraft tire according to the present invention wherein the rotation means comprises a plurality of vanes attached to a side of the tire.

As indicated above, FIG. 1 shows a perspective view of a fairly typical aircraft tire 10 of the invention. On one side 12 of the tire, the tire has rotation means which, in the preferred form of the invention, comprises a plurality of vanes 14 attached to the side 12 of the tire. The vanes are preferably made of the same rubber as the tire and are therefore preferably moulded integrally with the tire. In the embodiment shown in FIG. 1, the tire has a single circular array of vanes 14 on its side 12, each vane projecting laterally somewhat from the side of the tire.

Apart from the presence of the vanes 14, the tire 10 can be the same as any conventional aircraft tire. In use, the tires 10, are moulded on wheels of an aircraft. The aircraft can be of the type having a fixed undercarriage gear so that the wheels are permanently down. Alternatively, the aircraft can be of the type having a retractable and extendable undercarriage being lowered to put the wheels down when the aircraft is coming into land.

The number of vanes, and their size, shape and their disposition on the side 12 of each tire 10 are such that as the aircraft fitted with the tires and with its wheels down flies in direction "M" as shown in FIG. 1, the relative air flow past each tire 10 is generally in the opposed direction, direction "A", so as to produce a net force on each tire, causing or tending to cause rotation of the tire in the direction "R".

The object is such that, provided that any brakes associated with the aircraft wheels are released, rotation of the tire in direction "R" will occur. The effect of this is that on touchdown, each tire 10 is alreadly rotating in the appropriate direction "R" so as to reduce the velocity difference between the point of contact 16 of each tire 10 and the ground. By this means, the impact forces on each tire 10 are reduced, and can be considerably reduced, when the aircraft lands.

Figure 2:
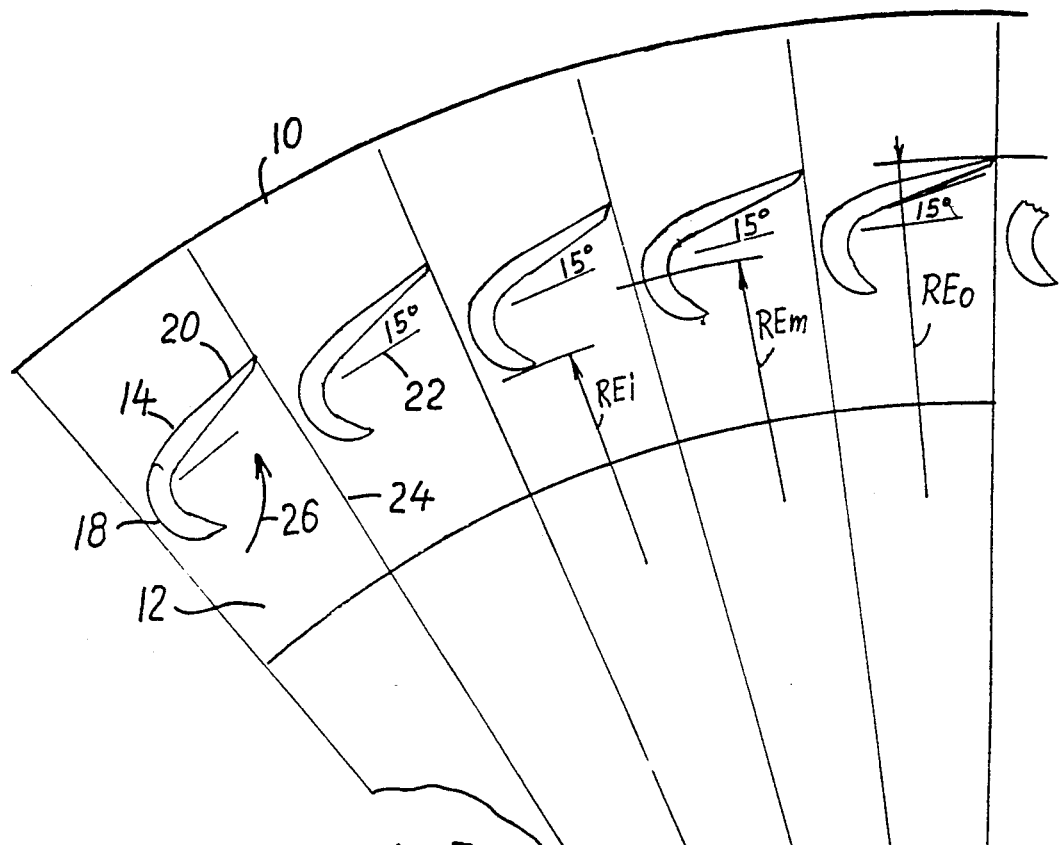
FIG. 2 shows a side view of a portion of the tire showing three vanes in more detail.
Figure 3:
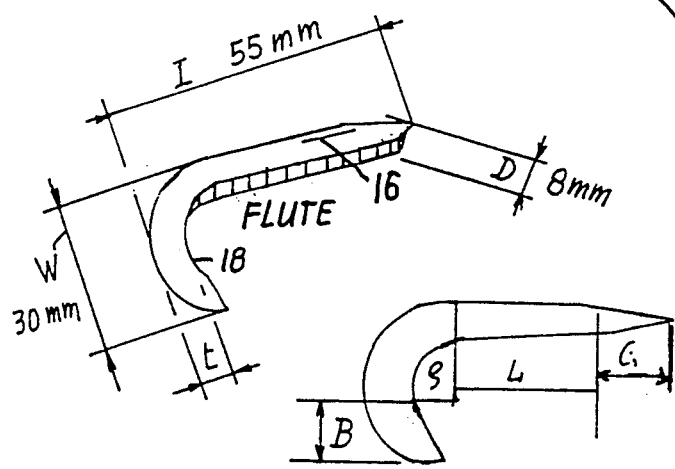
FIG. 3 shows a perspective view of a single vane.

In the preferred embodiment of the invention shown in FIGS. 1 to 3, the vane 14 has a hook or crescent shaped end portion 18 leading to an elongated tail end portion 20. As best shown in FIG. 2, the hook shaped end portion 18 of each vane faces inwardly. The tail end portion 20 of each vane is preferably angled outwardly with respect to the tangent 22 to the circle described by the tire radius at the position of the vane on the side 12 of the tire. Based on tests conducted so far, the preferred angle is about 15 degrees.

The preferred disposition of each vane relative to the adjacent vanes is best shown in FIG. 2. This preferred disposition has the tail end portion 20 of any one of vane 14 terminate on a radial line 24 with the next vane having its hooked shaped end portion 18 commencing substantially from that same radial line 24 by a small distance which distance is substantially less than the length "L" (see FIG. 3) of each vane. In considering airflow along the radial line 24 towards the tire of FIG. 2, the tail end portion 20 of the vanes tend to present something of a wall to the airflow and much air actually flows over the sides of the vanes rather than passing through the gaps 26 between the vanes. Of course, some airflow will pass through the gaps 26. This is shown in FIG. 1 where "A1" represents such an airflow. The reaction force "F1" on the vanes and hence on the tire is such as to cause the tire to rotate in the wrong direction.

However, in considering the airflow along radial line 24 in a direction away from the tire of FIG. 2, it can be seen that the free ends of the hook shaped end portion 18 of the vanes represents a relatively small obstruction to airflow and the gaps 26 tend to act as funnels funneling airflow therethrough. In FIG. 1, this is shown by airflow "A2" which produces a force "F2" on the vanes and therefore on the tire tending to rotate the tire in the desired direction.

The force "F2" is greater than the force "F1" and therefore the net force is such as to cause rotation of the tire in the desired direction.

A single vane 14 is shown in more detail in FIG. 3. The length "L" of the vane may be about 55 mm and the width "w" may be about 30 mm. The depth of the vane "d", that is its projection from the side 12 of the tire, may be about 8 mm. A typical aircraft tire may have about 40 such vanes.

The above describes a preferred form of the present invention. However, various modifications can be made to the aircraft tire of the present invention without departing from the scope of the invention as has been broadly defined above. For a start, the vanes can have sizes, shapes and dispositions other than those which have been given above by way of example only. More than one circular array of vanes can be provided on a side 12 of the tire. The tire shown in FIG. 1 is suitable for locating on the left-hand side of the aircraft. However, it would not be suitable for the right-hand side of the aircraft if detained in the same orientation nor would it be suitable for the left-hand side of the aircraft if reversed. Therefore, an aircraft tire may have vanes provided on both of its sides so that it does not matter if the tire is used on the left or the right-hand side of the aircraft.

Instead of rotating means being in the form of vanes, they can be provided in the form of channels of appropriate shape and size in one of both sides of an aircraft tire, the air "A" flowing past the tire flowing through the channels in a manner similar to that flowing between the vanes of the preferred construction of tire.

Where the tires, and therefore the wheels, of an aircraft are rotating in an appropriate direction prior to and at point of touchdown, a number of advanges result. The wear on the tire is reduced because of the lack of skidding of the tires on the ground at touchdown. Therefore, the tendency for rubber to be torn from the tire is reduced and the number of landings permissible on the tires before they are replaced is increased.

The reduction of impact forces on the tires also reduces the stress on the undercarriage of the aircraft at touchdown. The drag as the wheels attain landing speed at touchdown is reduced.

ANALYSIS OF THE INVENTION

When a body moves with a forward speed "S" through common air of sea level with an area "A" of the body, the body will cause a resistance according to equation (1):

$$K = A \cdot Cw(\rho/2)S^2 \quad (1)$$

with "rho" = density of air = about 0.125 Kg s$^2$/m,
S = speed in m/s,
A = area in m$^2$,
K = Kg and "Cw" = coefficient of resistance.

FIGS. 7 and 8 show halves of hollow balls in airstreams. FIG. 7 shows the air to flow against the outwards bowed surface of the half ball and the half ball has now the coefficient of resistance of "Cw" = 0.33. In FIG. 8 the air blows into the hollow open part of the half ball and the coefficient of resistance is now "Cw" = 1.33. These coefficients of resistance are known in the technologies, for example, from Huette I, page 797. Hutte is the german engineering hand book of Ernst publishing Company in Germany.

Figure 9:
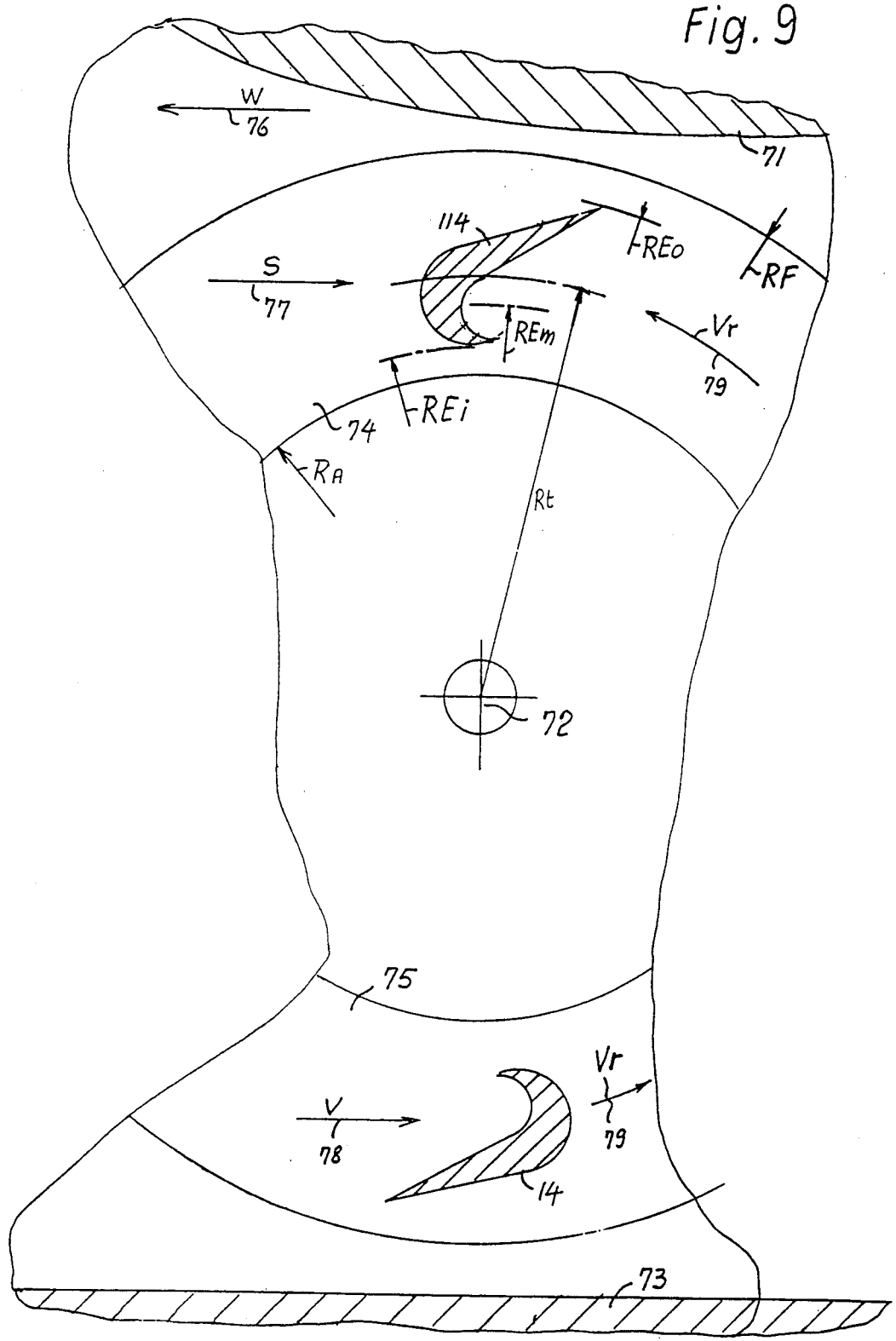
FIG. 9 illustrates a cross sectional view through vanes of the invention on the top- and bottom-portions of a tire with the back ground illustrating in a view from the side the respective portions of the tire and of the aircraft.

FIG. 9 shows a schematic which illustrates a portion of the tire of the invention below the aircraft but still above the ground. The body 71 of the aircraft holds on the landing gear structure the axis 72 of the wheel on which the tire of the invention is assembled. Below the tire is the surface 73 of the runway on which the aircraft intends to land. This surface is more remote from the tire than shown in FIG. 9. The portion of the tire which is upwardly located in the Figure is the top portion or upper portion 74 of the tire. The portion of the tire which is below the axis 72 located is the bottom portion or lower portion 75 of the tire. On the top and bottom portions each one single vane or resistance body of the invention is shown. This body is cited by 14 on the bottom portion and by 114 on the top portion of the tire. All vanes or resistance bodies are calculated in this analysis as located with their centers on a periphery which is defined by a radius "Rt" around the axis 72 of the tire.

It will be understood, that, as long as the tire is in rest, which means as long as the does not revolve, the entire tire is subjected to the forward speed of the aircraft 71. This forwards speed is defined as 76 = "S". However, if the tire revolves anti-clockwise in FIG. 9, the portion of the tire with radius "Rt", and thereby the centers of the resistance bodies 14, 114, become the speed "Vr" = 2 Rt pi U $$Vr = 2Rt\pi U \quad (2)$$

with U = revolutions per second. The velocity "V" then appears in m/sec.

From FIGS. 4, 7 and 8 it is immediately seen, that the cross sectional areas of the vane or resistance body of FIG. 4 is about similar to the hollow half balls of FIGS. 7 and 8. Not exactly similar, because the vanes or resistance bodies 14,114 are not spherical in FIG. 1, but more close to hollow halfs of cylinders. On the other hand, the inclined tail portions 47 of vanes 14 add efficiencies in the direction of the invention as additions to the coefficients of the half hollow cylinders. Since the actual coefficients of resistance of the vanes are not yet measured, it will be at hand of the above explanations assumed that the coefficients of resistance in flow of the vanes 14,114 are substantially equal to those of FIGS. 7 and 8, respectively. Errors can become corrected during further prosecution and development of the invention. Thus, it should be memorized that the coefficient of resistance of the vane on the top portion of the tire will be "Cwt" = 0.3 and the coefficient of resistance of the vane 14 on the bottom portion of the tire will be "Cwb" = 1.3 respective to the existing flows of air.

$$Cwt = 0.33 \quad (3)$$

$$Cwb = 1.3 \quad (4)$$

The effective areas of the vanes are equal on the top portion and on the bottom portion of the tire. This effective area is the projection of the shape of the vane in the direction of the flow of air against the respective vane.

The sum of mass of the wheel plus tire will be considered to be concentrated along the circle with radius "Rt" of FIG. 9 and this mass is weight/9.81 m/s$^2$.

$$\text{Mass of wheel} + \text{tire} = Kg(\text{weight})/9.81 = Kg \text{ mass} \quad (5)$$

It can be seen from FIG. 9 that, when the wheel revolves anticlockwise in the Figure, the relative velocity towards the vane becomes V = S minus Vr.

$$V = S - Vr \quad (6)$$

and the air speed towards the vane 114 on the top portion becomes W = S + Vr.

$$W = S + Vr \quad (7)$$

If a force acts against a body of a mass "M", the body becomes accelerated in accordance with Newton's law of force. It says:

$$\text{Force} = \text{mass} \times \text{accelaration, or:} F = m\ a. \quad (8)$$

From the above it is seen that the resistance of the vane 14 on the bottom portion is:

$$A \cdot Cwb(\rho/2)V^2 \quad (9)$$

while the resistance of the vane 114 on the top portion is:

$$A \cdot Cwt(\rho/2)W^2 \quad (10)$$

Figure 10:
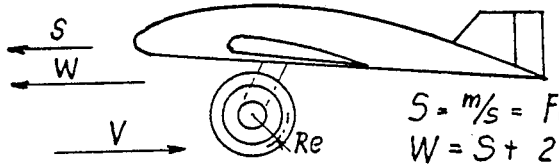
FIG. 10 illustrates a calculation form for the calculation of the acceleration of the tire and its final speed of revolution after the tire became objected to the flow of air after the landing gear was extracted from the aircraft.

Defining the density of the air as 0.125 and the half of it as 0.0625 it is now easily possible to write a calculation form as it is shown in FIG. 10. In FIG. 11 a calculation of a sample is carried out in the form of FIG. 10. In the form of FIG. 11 the weight of the wheel plus tire is considered to be 100 Kg which brings the sum of mass of 100/9.81 = 10.19 Kg mass. Further, six effective vanes are considered on the top and bottom portions (three on each side) and the sum of the effective area "A" of these vanes is considered to be 0.06 m$^2$. For example, six vanes of area 10 × 10 cm = 0.01 m$^2$.

An important novel step in forms 10 and 11 is that at the first calculation the tire is calculated to be in rest. The first vertical column in these forms now defines an intervall of time at which the tire with the wheel becomes accelerated under the forces of the air flows. In the actual calculation of the form of FIG. 11, these intervalls are considered to be 10 seconds. The assumed rough acceleration during the respective time intervall "Δt" (here 10 seconds) is calculated in the forms and the therefrom resulting new velocity "Vr" is then also calculated. The so obtained new sums of speeds "W" and "V" are then used as a start off in the next calculation for the next intervall of time in the respective horizontal line of calculations.

The forward speed "S" of the aircraft is calculated with 40 m/s in FIG. 11, which means with a speed of 144 km per hour.

The calculation in FIG. 11 shows that the tire accelerates fast at early time after start of revolving, while it accelerates slowly later after the start and nears a speed value at which no accelerates appears any more because the resistance on the vane in the top portion becomes equal to that in the bottom portion, due to the higher relative air speed on the vane of the top portion.

However, the result of the calculation also shows that after only one single minute=60 seconds, the tire has already a speed of almost 14 m/s at radius "Rt" which means an even higher speed at the outer face of the tire which will touch the run way at moment of landing. That is 14/40=0.35×100=35 percent of the landing speed of the aircraft. That shows that the invention is very effective and the tire of the invention obtains a much longer life that the aircraft tire without the means of the invention has. The form of FIG. 10 may be used for other outgoing data, especially also for different speeds "S" of the aircraft.

FURTHER DESCRIPTION OF THE PREFERRED EMBODIMENTS

The analysis of the invention has brought to light, that it is, due to the increasing relative speed "W" of the upper portion of the tire, a large effective area "Ab" is desired at the lower portion of the tire, while a smaller area "At" is desired at the upper portion of the tire for the respective vane or resistance body 14,114.

Consequently, the invention obtains a still better effect by the application of FIGS. 4 to 6.

FIG. 4 illustrates one of the samples of the basic structures of the vane of the invention. One portion of the inner face is formed by radius "ri" around line 52, while a portion of the outer face is formed by radius "Ro" around line 51. Both faces with radii Ro and ri meet at the bottom tip face 56. The radii meet the inclined faces which form the inclined tail 47 between the angles "beta"=54 and "alpha"=53 which go from the outer tip face 55. These geometrical data are given for the exact calculation of factors of resistance. For different angle and radii around different points, slightly different coefficients of resistance will appear.

FIGS. 5 and 6 illustrate, that for a most effective embodiment of the invention, the vanes of resistant bodies get inclinable flexible portions, for example, shanks 58 between roots 57 on the tire 49 and a bending portion 59, shanks 60 between bending portions 59 and 61 as well as outer wing portions 63 towards tips 64. The outer portions may be tapered in cross section by taper faces 62.

FIG. 5 shows the vane arrangement partially laterally extended while FIG. 6 illustrates it almost entirely laterally extended with shanks 158, 160, outer wing 162 and bending portions 159, 161 as well as tip face 164.

The outer face of the tire 49 is shown by 48. One sees the distance from the root 57 to tip 64 to be 65 in FIG. 5 while it is 165 between root 57 and tip 164 in FIG. 6. Distance 165 is considerably longer than distance 65 and defines thereby a larger area "A". FIG. 6 shows the vane on the lower portion of the tire with the air blowing from the right in FIG. 6, pressing against bend 159, shanks 158 and 160 as well as against outer wing 162, thereby forcing the vane to obtain its large dimension 165. In FIG. 5 the vane is shown on the top portion of the tire with the wind blowing from the left against the shanks and bend 59 as well as against the outer wing 62. Consequently, the airflow forces the wing of FIG. 5 to obtain its small dimension 65.

The invention aims to materialize wings of FIG. 5 with dimension equal to zero at time of location at the upper portion of the tire and with maximal length of dimension 165 at location of the respective vane at the lower portion of the tire.

If this aim will become obtained, the resistance "Ft" of the calculation form of FIGS. 10 and 11 becomes "zero" because the area "At" becomes "zero". Then, there is no braking force on the tire any more and the tire will accelerate very fast to obtain at the lower portion almost exactly the speed "S" of the aircraft. The tire would then touch onto the ground at the moment of landing without almost no difference in speed between the outer surface of the tire and the ground.

Instead of providing plural shank portions and plural bending portions for a vane it is also possible to use a single shank portion with the root on the tire forming the bending portion.

The features of the invention also reduce the possibility of metal fatigue in the fuselage of the aircraft in the area of the undercarriage and the undercarriage itself.

Another advantage is that the tendency for the tires of the aircraft to aquaplane on wet surfaces is reduced as the tires on rotating wheels tend to cut through surface water rather than slide over the surface, this allowing the tires to make contact with the landing ground sooner. Yet another advantage, is improved comfort to passengers and crew of the aircraft on touchdown. With the aircraft wheels rotating prior to touchdown in the appropriate direction the rough or rumbling vibrations through the aircraft as the wheels make contact with the landing ground is reduced. Where the aircraft wheels are stationary on touchdown they have to accelerate rapidly to achieve landing speed at the point of landing.

Therefore it is believed that the present invention offers significant advantages over existing types of aircraft tire.

The calculations of FIGS. 11 to 13 bring the result that regardless of aircraft speed "W" the tire accelerates each time to about 35 percent of the speed of "W" if the coefficients of resistance are as assumed in the calculations. At higher aircraft speed "W" the wheels accelerate faster but end their acceleration at same ratio of speed relative to the speed of the aircraft. This shows the great importance of election of effective shapes of the means of the invention to obtain the best increase of speed of the by the means of the invention rotated wheels. The coefficients of resistance at upper- and lower- portions of the tire almost exclusively define the rate of "speed-up" to the wheels.

Since the invention is still more in detail described in the present and probably also in future claims, the claims are considered to constitute a portion of the summary of the invention and of the description of the preferred embodiments of the invention.

I claim:

1. A tire, mountable on a wheel of a landing gear of an aircraft, comprising, in combination, an axially outer side wall which forms a part of said tire, while said side wall extends with equal radii from the axis of said wheel peripherally all around said tire, wherein plural local extensions are provided at spaced intervals circumferentially on said side wall to extend from said side wall in an axially outward direction relative to said axis and parallel to said axis, wherein said extensions form crescent-shaped configurations with peripherally elongated radially outer tail end portions, said radially outer tail end portions extending radially outwardly with respect to the tangent to the circle described by the tire radius at the location of the extensions at an angle of between 10 and 20 degrees, wherein said extensions are open in the direction of movement of said aircraft as long as they are on the lower portion of said tire but open in the direction to the rear of said aircraft at times when they are located in the higher portion of said tire, for causing rotation of the tire prior to landing when mounted on said aircraft landing gear.

2. A tire as in claim 1, wherein said extensions are bordered by inner and outer faces which are defined by two straight faces and two curved faces with said curved faces bordering said crescent shaped configurations while said straight faces border said peripherally elongated radially outer tail end portions, wherein said curved portions of said outer faces are defined by first radii Ro around first centers (51) and said curved portions of said inner faces are formed by second radii ri around second centers (52) whereby said curved portions of said outer faces with radii Ro and of said inner faces with radii ri meet to form radially inner tips (56) and said straight faces bordering said peripherally elongated tail end portions meet to form radially outer tips (55).

3. A tire as in either claim 1 or claim 2, wherein said extensions contain flexible portions for lateral extension when located at the lower portion of said tire and for lateral contraction when located in the higher portion of said tire.

4. A tire as in claim 1, wherein said angle is about 15 degrees.

* * * * *